US012697730B2

(12) United States Patent
Wang et al.

(10) Patent No.: US 12,697,730 B2
(45) Date of Patent: Aug. 4, 2026

(54) ZERO CALIBRATION METHOD AND RELATED DEVICE FOR ROBOTIC ARM CONTROL

(71) Applicant: CHINA SOUTHERN POWER GRID TECHNOLOGY CO., LTD., Guangzhou (CN)

(72) Inventors: Yang Wang, Guangzhou (CN); Hui Wu, Guangzhou (CN); Xiaoming Mai, Guangzhou (CN); Xiaoye Zhang, Guangzhou (CN); Peixin Li, Guangzhou (CN); Guoying Lin, Guangzhou (CN); Hao Wu, Guangzhou (CN); Jinghui Song, Guangzhou (CN); Qi Zeng, Guangzhou (CN); Ximeng Zhu, Guangzhou (CN); Qijiang Su, Guangzhou (CN); Junjie Guo, Guangzhou (CN); Ziyang Li, Guangzhou (CN); Jin Tan, Guangzhou (CN)

(73) Assignee: CHINA SOUTHERN POWER GRID TECHNOLOGY CO., LTD., Guangzhou (CN)

( * ) Notice: Subject to any disclaimer, the term of this patent is extended or adjusted under 35 U.S.C. 154(b) by 38 days.

(21) Appl. No.: 18/944,026

(22) Filed: Nov. 12, 2024

(65) Prior Publication Data

US 2025/0065508 A1 Feb. 27, 2025

Related U.S. Application Data

(63) Continuation-in-part of application No. PCT/CN2023/110985, filed on Aug. 3, 2023.

(30) Foreign Application Priority Data

Jun. 16, 2023 (CN) .......................... 202310721857.1

(51) Int. Cl.
*B25J 9/16* (2006.01)

(52) U.S. Cl.
CPC .................................... *B25J 9/1692* (2013.01)

(58) Field of Classification Search
CPC ...... B25J 9/1653; B25J 9/1692; B25J 9/1664; B25J 9/1697; B25J 13/088
See application file for complete search history.

(56) References Cited

U.S. PATENT DOCUMENTS

2022/0009095 A1* 1/2022 Huang ................... B25J 9/1607
2023/0111360 A1* 4/2023 Meglan ................. A61B 34/30
700/253

(Continued)

FOREIGN PATENT DOCUMENTS

CN 114932551 A 8/2022
CN 115816448 A 3/2023

OTHER PUBLICATIONS

Yingwu He et al., Improved Home Position Self-tuning Method of Industrial Robot Based on Tool Coordinate Calibration, Machine Tool & Hydraulics, Mar. 2021, pp. 14-19, vol. 49, No. 5.

(Continued)

*Primary Examiner* — Dalena Tran

(57) ABSTRACT

A zero calibration method includes: adding, based on a first forward kinematics model of a robotic arm of a robot, zero deviations of each joint to form a second forward kinematics model, and simultaneously solving the second forward kinematics model and the first forward kinematics model to obtain an end deviation function; sending target end pose instructions to the robotic arm in a current zero point situation, and acquiring a spatial deviation of an actual position of an end; inputting position information of each joint angle and the spatial deviation, after each stop of motion of the end, into the end deviation function, and performing phase shifting to obtain an objective optimiza- (Continued)

Add, based on a first forward kinematics model of a robotic arm of a robot, zero deviations of each joint of the robot to form a second forward kinematics model; and simultaneously solve the second forward kinematics model and the first forward kinematics model to acquire an end deviation function — 101

Send target end pose instructions to the robotic arm in a current zero point situation, and acquire a spatial deviation of an actual position of an end — 102

Input position information of each joint angle and the spatial deviation, after each stop of motion of the end, into the end deviation function, and perform phase shifting to acquire an objective optimization function — 103

Solve the objective optimization function to obtain a zero deviation value — 104 tion function; and solving the objective optimization function to obtain a zero deviation value.

8 Claims, 1 Drawing Sheet

(56)　　　　　　　References Cited

U.S. PATENT DOCUMENTS

2024/0189987 A1 *　6/2024　Gebauer ................ B25J 9/1692
2024/0198534 A1 *　6/2024　Uruma ................... B25J 9/1692

OTHER PUBLICATIONS

Yingzhong Tian et al., Algorithm and Experimental Study on Error Compensation for 6R Robots with Composite Mechanisms, Nov. 2015, pp. 89-92, vol. 53, No. 615.

* cited by examiner

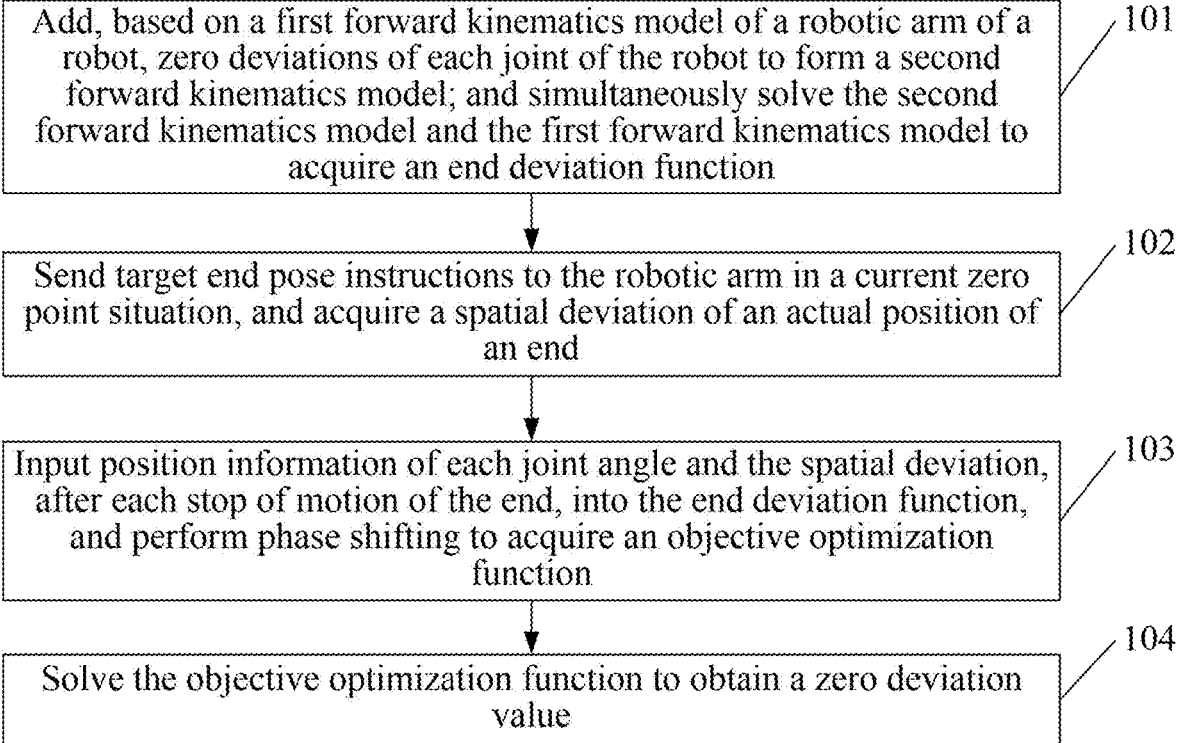

Add, based on a first forward kinematics model of a robotic arm of a robot, zero deviations of each joint of the robot to form a second forward kinematics model; and simultaneously solve the second forward kinematics model and the first forward kinematics model to acquire an end deviation function ⟋ 101

Send target end pose instructions to the robotic arm in a current zero point situation, and acquire a spatial deviation of an actual position of an end ⟋ 102

Input position information of each joint angle and the spatial deviation, after each stop of motion of the end, into the end deviation function, and perform phase shifting to acquire an objective optimization function ⟋ 103

Solve the objective optimization function to obtain a zero deviation value ⟋ 104

FIG. 1

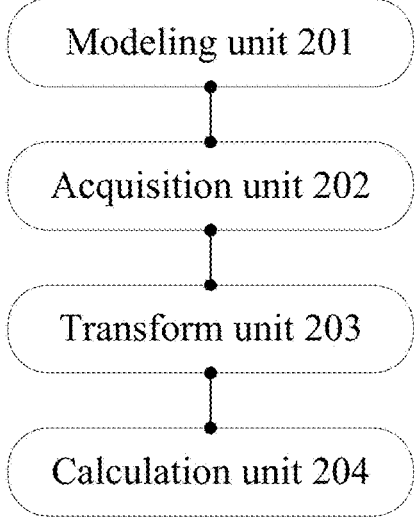

Modeling unit 201

Acquisition unit 202

Transform unit 203

Calculation unit 204

FIG. 2

ZERO CALIBRATION METHOD AND RELATED DEVICE FOR ROBOTIC ARM CONTROL

CROSS REFERENCE TO RELATED APPLICATIONS

The present application is a Continuation-In-Part Application of PCT Application No. PCT/CN2023/110985 filed on Aug. 3, 2023, which claims the benefit of Chinese Patent Application No. 202310721857.1 filed on Jun. 16, 2023. All the above are hereby incorporated by reference in their entirety.

TECHNICAL FIELD

The present disclosure relates to the technical field of robot control, and in particular to a zero calibration method and related device for a robotic arm control.

BACKGROUND

With the development of robotics, flexible and high-precision serial robots are arranged at the end of a traditional construction machine or tool with high capacity and large-scale mobility to achieve precision operations in large-scale moving spaces. This has become a development trend and is applied in fields such as aircraft fuselage processing, high-speed train body polishing, and ship exterior welding. This type of equipment can not only be used for mechanical processing in workshop environments, but also for outdoor high-altitude operations in high-risk industries, such as live repair of outdoor overhead power lines and filling of explosives.

High-precision target tracking is the key to the functionality of this type of robot. The pose of the target relative to the robot is acquired through visual perception, and high-precision interaction between the end effector of the robotic arm and the operation point is achieved through collaborative motion control of dual robotic arms. However, due to assembly errors in the robotic arms, the zero points of each encoder between the two arms are not physically consistent. As a result, the two arms cannot achieve high-precision physical interaction in the same coordinate system, that is, the two arms cannot track the spatial pose of the same target with the same precision, which is not conducive to achieving dual arm cooperation. Therefore, solving the zero calibration problem of robotic arms is particularly important for dual-arm collaborative robots that are based on visual positioning and rely on absolute positioning accuracy.

However, at present, the commonly used calibration methods in the industry mainly focus on single-arm robots, including hardware and software methods. In the hardware method, scales or marks with certain accuracy are provided on the outer shell of the robot, and the calibration of the scales or marks is performed in the assembly process of the robotic arms to achieve zero calibration. This method is suitable for large-scale robotic arm production lines with a high profit margin to ensure that the scales or marks achieve high machining accuracy. Otherwise, if the assembly error is too large, the need of dual arm collaboration will not be met. In the software method, the end effector of the robotic arm is controlled to touch a fixed theoretical position point in different poses, and the difference between the theoretical and actual positions is measured. A system of nonlinear equations is constructed, and the deviation angles of each joint are acquired through Gaussian elimination. This method is difficult to implement due to the difficulty in algorithm implementation, which hinders its widespread use.

SUMMARY

The present disclosure provides a zero calibration method and related device for a robotic arm control, solving the technical problem that the prior art is difficult to implement due to the difficulty in algorithm implementation, which hinders widespread use of the prior art.

In View of this, a First Aspect of the Present Disclosure Provides a Zero Calibration Method for a Robotic Arm Control, Including:

adding, based on a first forward kinematics model of a robotic arm of a robot, zero deviations of each joint of the robot to form a second forward kinematics model; and simultaneously solving the second forward kinematics model and the first forward kinematics model to obtain an end effector deviation function;

sending target end effector pose instructions to the robotic arm in a current zero point situation, and acquiring a spatial deviation of an actual position of an end effector;

inputting position information of each joint angle and the spatial deviation, after each stop of motion of the end effector, into the end effector deviation function, and performing transposition to obtain an objective optimization function; and solving the objective optimization function to obtain a zero deviation value.

Optionally, the sending target end effector pose instructions to the robotic arm in a current zero point situation, and acquiring a spatial deviation of an actual position of an end effector specifically includes:

sending m target end effector pose instructions to the robotic arm in the current zero point situation; and acquiring the spatial deviation between a position of the end effector after the sending of each of second to m-th target end effector pose instructions and after stop of motion of the robotic arm and the actual position of the end effector after the sending of a first target end effector pose instruction.

Optionally, the end effector deviation function is specifically:

$$\Delta p = p' - p = f(q + \Delta q) - f(q);$$

where, f is a function that characterizes a relationship between values of each joint angle of the robotic arm and a spatial pose of the end effector; q is an n-dimensional vector, representing the values of each joint angle; p is a 3-dimensional vector, representing the spatial pose of the end effector based on f; and $\Delta q$ is an n-dimensional vector, representing a deviation of each joint angle between the current zero point and an ideal zero point.

Optionally, the objective optimization function is specifically:

$$e_i = \Delta p_i - (f(q_i + \Delta q) - f(q_i));$$

where, i=1,2, . . . ,m; f is a function that characterizes a relationship between values of each joint angle of the robotic arm and a spatial pose of the end effector; q is an n-dimensional vector, representing the values of each joint angle; p is a 3-dimensional vector, representing the spatial pose of the end effector based on f; and $\Delta q$ is an n-dimensional vector, representing a deviation of each joint angle between the current zero point and an ideal zero point.

A second aspect of the present disclosure provides a zero calibration system for a robotic arm control, including:

a modeling unit, configured to add, based on a first forward kinematics model of a robotic arm of a robot, zero deviations of each joint of the robot to form a second forward kinematics model; and simultaneously solve the second forward kinematics model and the first forward kinematics model to obtain an end effector deviation function;

an acquisition unit, configured to send target end effector pose instructions to the robotic arm in a current zero point situation, and acquire a spatial deviation of an actual position of an end effector;

a transform unit, configured to input position information of each joint angle and the spatial deviation, after each stop of motion of the end effector, into the end effector deviation function, and perform transposition to obtain an objective optimization function; and a calculation unit, configured to solve the objective optimization function to obtain a zero deviation value.

Optionally, the acquisition unit is specifically configured to:

send m target end effector pose instructions to the robotic arm in the current zero point situation; and acquire the spatial deviation between a position of the end effector after the sending of each of second to m-th target end effector pose instructions and after stop of motion of the robotic arm and the actual position of the end effector after the sending of a first target end effector pose instruction.

Optionally, the end effector deviation function is specifically:

$$\Delta p = p' - p = f(q + \Delta q) - f(q);$$

where, f is a function that characterizes a relationship between values of each joint angle of the robotic arm and a spatial pose of the end effector; q is an n-dimensional vector, representing the values of each joint angle; p is a 3-dimensional vector, representing the spatial pose of the end effector based on f; and $\Delta q$ is an n-dimensional vector, representing a deviation of each joint angle between the current zero point and an ideal zero point.

Optionally, the objective optimization function is specifically:

$$e_i = \Delta p_i - (f(q_i + \Delta q) - f(q_i));$$

where, i=1,2, . . . ,m; f is a function that characterizes a relationship between values of each joint angle of the robotic arm and a spatial pose of the end effector; q is an n-dimensional vector, representing the values of each joint angle; p is a 3-dimensional vector, representing the spatial pose of the end effector based on f; and $\Delta q$ is an n-dimensional vector, representing a deviation of each joint angle between the current zero point and an ideal zero point.

A third aspect of the present disclosure provides a zero calibration device for a robotic arm control, including a processor and a memory, where the memory is configured to store program code and transmit the program code to the processor; and the processor is configured to execute the steps of the zero calibration method for a robotic arm control in the first aspect based on an instruction in the program code.

A fourth aspect of the present disclosure provides a computer-readable storage medium, where the computer-readable storage medium is configured to store a program code for executing the zero calibration method for a robotic arm control in the first aspect.

It can be seen from the above technical solutions that the present disclosure has the following advantages:

The present disclosure provides a zero calibration method for a robotic arm control, including: adding, based on a first forward kinematics model of a robotic arm of a robot, zero deviations of each joint of the robot to form a second forward kinematics model; and simultaneously solving the second forward kinematics model and the first forward kinematics model to obtain an end effector deviation function; sending target end effector pose instructions to the robotic arm in a current zero point situation, and acquiring a spatial deviation of an actual position of an end effector; inputting position information of each joint angle and the spatial deviation, after each stop of motion of the end effector, into the end effector deviation function, and performing transposition to obtain an objective optimization function; and solving the objective optimization function to obtain a zero deviation value.

Compared with the prior art, the present disclosure has the following advantages.

1. The present disclosure adopts a simple solution method, which is not limited by the number of joints in the robotic arm and is suitable for common 3-degree-of-freedom, 6-degree-of-freedom, and 7-degree-of-freedom robotic arms.

2. The present disclosure is not limited by the machining accuracy of the joints in the robotic arm, and can achieve zero calibration even if it is impossible to machine scales or marks.

BRIEF DESCRIPTION OF THE DRAWINGS

FIG. 1 is a flowchart of a zero calibration method for a robotic arm control according to an embodiment of the present disclosure; and FIG. 2 is a schematic diagram of a zero calibration system for a robotic arm control according to an embodiment of the present disclosure.

DETAILED DESCRIPTION

To enable those skilled in the art to better understand the solutions of the present disclosure, the technical solutions in the embodiments of the present disclosure will be clearly and completely described below in conjunction with the drawings in the embodiments of the present disclosure. Obviously, the described embodiments are only a part of, not all of, the embodiments of the present disclosure. All other embodiments obtained by a person of ordinary skill in the art based on the embodiments of the present disclosure without creative efforts shall fall within the protection scope of the present disclosure.

An embodiment of the present disclosure provides a zero calibration method for a robotic arm control. As shown in FIG. 1, the method includes the following steps.

Step 101. Based on a first forward kinematics model of a robotic arm of a robot, zero deviations of each joint of the robot are added to form a second forward kinematics model. The second forward kinematics model and the first forward kinematics model are simultaneously solved to obtain an end effector deviation function.

It should be noted that based on the first forward kinematics model of the robotic arm, the zero deviations of each joint are added to form the new second forward kinematics model, which is simultaneously solved with the first kinematics model to obtain the end effector deviation function $\Delta p$, that is:

$$p = f(q) \tag{1}$$

$$p' = f(q + \Delta q) \tag{2}$$

$$\Delta p = p' - p = f(q + \Delta q) - f(q) \tag{3}$$

where, f is a function that characterizes a relationship between values of each joint angle of the robotic arm and a spatial pose of the end effector; q is an n-dimensional vector, representing the values of each joint angle; p is a 3-dimensional vector, representing the spatial pose of the end effector based on f; $\Delta q$ is an n-dimensional vector, representing a deviation of each joint angle between the current zero point and an ideal zero point; and p' is a 3-dimensional vector, representing an actual spatial pose of the end effector.

Step 102. Target end effector pose instructions are sent to the robotic arm in a current zero point situation, and a spatial deviation of an actual position of an end effector is acquired.

It should be noted that multiple target end effector pose instructions are sent to the robotic arm in the current zero point situation, and they must ensure that the position remains unchanged and the pose is variable.

If m instructions are sent, a measurement system is used to acquire the spatial deviation between a position of the end effector after the sending of each second to m-th target end effector pose instructions and after stop of motion of the robotic arm and the actual position of the end effector after the sending of a first target end effector pose instruction.

Step 103. Position information of each joint angle and the spatial deviation, after each stop of motion of the end effector, are input into the end effector deviation function, and transposition is performed to obtain an objective optimization function.

It should be noted that the position of each joint angle after each stop of motion of the end effector is input to the rightmost side of Eq. (3), and the spatial deviation of the end effector is input to the leftmost side of Eq. (3). The objective optimization function ei is acquired by transposition as follows:

$$e_i = \Delta p_i - (f(q_i + \Delta q) - f(q_i)), i = 1, 2, \ldots, m \tag{4}$$

where, q is an n-dimensional vector, representing the values of each joint angle; the subscript i represents an i-th acquisition; and $\Delta q$ is an n-dimensional vector, representing a deviation of each joint angle between the current zero point and an ideal zero point.

Step 104. The objective optimization function is solved to obtain a zero deviation value.

It should be noted that in order to improve optimization accuracy, a new optimization function g can be constructed as follows:

$$g = \sqrt{\sum_{i=1}^{m} e_i^2} \tag{5}$$

In the equation, $e_i$ is the objective optimization function, and the problem of solving the zero deviation of the joint angle is transformed into one of solving the value of $\Delta q$ when g is minimized.

At this point, the zero deviation is acquired by solving through Global Optimization Toolbox of the Matlab software.

This embodiment provides a zero calibration method for a robotic arm control, which solves the zero calibration problem of the robotic arm by solving the zero deviation of the joint angle based on an evolutionary algorithm. The method equivalently treats the zero calibration process of the robot joint as a global optimization problem of a constrained multivariate function, and determines the deviation between the current zero point and the ideal zero point by finding an optimal solution.

The above embodiment of the present disclosure provides a zero calibration method for a robotic arm control, and the following embodiment of the present disclosure provides a zero calibration system for a robotic arm control.

An embodiment of the present disclosure provides a zero calibration system for a robotic arm control. As shown in FIG. 2, the units of the system are described as follows.

A modeling unit 201 is configured to add, based on a first forward kinematics model of a robotic arm of a robot, zero deviations of each joint of the robot to form a second forward kinematics model; and simultaneously solve the second forward kinematics model and the first forward kinematics model to obtain an end effector deviation function.

An acquisition unit 202 is configured to send target end effector pose instructions to the robotic arm in a current zero point situation, and acquire a spatial deviation of an actual position of an end effector.

A transform unit 203 is configured to input position information of each joint angle and the spatial deviation, after each stop of motion of the end effector, into the end effector deviation function, and perform transposition to obtain an objective optimization function.

A calculation unit 204 is configured to solve the objective optimization function to obtain a zero deviation value.

The modeling unit, the acquisition unit, the transform unit, and the calculation unit are computers.

Further, an embodiment of the present disclosure provides a zero calibration device for a robotic arm control, including a processor and a memory.

The memory is configured to store program code and transmit the program code to the processor.

The processor is configured to execute the steps of the zero calibration method for a robotic arm control in the above method embodiment based on an instruction in the program code.

Further, an embodiment of the present disclosure provides a computer-readable storage medium. The computer-readable storage medium is configured to store a program code for executing the zero calibration method for a robotic arm control in the above method embodiment.

Those skilled in the art clearly understand that for convenience and brevity of description, reference may be made to corresponding processes in the foregoing method embodiment for specific working processes of the foregoing system and units. Details are not described herein again.

The terms such as "first", "second", "third", and "fourth" in the specification and drawings of the present disclosure are intended to distinguish between similar objects but do not necessarily indicate a specific order or sequence. It should be understood that the data used in such a way may be exchanged under proper conditions to make it possible to implement the described embodiments of the present disclosure in other sequences apart from those illustrated or described here. Moreover, the terms "include", "contain", and any other variants mean to cover the non-exclusive inclusion, for example, a process, method, system, product, or device that includes a list of steps or units is not necessarily limited to those steps or units which are clearly listed, but may include other steps or units which are not expressly listed or inherent to such a process, method, system, product, or device.

It should be understood that in the present disclosure, the term "at least one" refers to one or more, and the term "multiple" refers to two or more. The term "and/or" describes an association relationship of associated objects, and can indicate three relationships. For example, "A and/or B" may mean: A exists alone, A and B exist at the same time, and B exists alone, where A and B can be singular or plural. The character "/" generally indicates an "or" relationship between associated objects. The term "at least one of the following items" or similar expression refers to any combination of these items, including any combination of singular or plural items. For example, "at least one of a, b, and c" can indicate: "a, b, and c", "a and b", "a and c", "b and c", or "a and b and c", where a, b, and c can be singular or plural.

In several embodiments provided in the present disclosure, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may be or may not be physically separate, and parts displayed as units may be or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The above integrated unit may be implemented either in a form of hardware or in a form of a software functional unit.

The integrated unit, if implemented in the form of a software functional unit and sold or used as a stand-alone product, may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium, and includes instructions for instructing a computer device (which may be a personal computer, a server, a network device, or the like) to perform all or some of the operations of the methods described in the embodiments of the present disclosure. The foregoing storage medium includes: any medium that can store program code, such as a USB flash disk, a removable hard disk, a read-only memory (ROM), a random access memory (RAM), a magnetic disk, or an optical disc.

The above embodiments are provided merely to describe the technical solutions of the present disclosure, and are not intended to limit the present disclosure. Although the present disclosure is described in detail with reference to the above embodiments, those of ordinary skill in the art should understand that they can still modify the technical solutions described in the above embodiments, or make equivalent substitutions to some technical features therein. These modifications or substitutions do not make the essence of the corresponding technical solutions depart from the spirit and scope of the technical solutions of the embodiments of the present disclosure.

The invention claimed is:

1. A zero calibration method for a robotic arm control, comprising:

adding, based on a first forward kinematics model of a robotic arm of a robot, zero deviations of each joint of the robot to form a second forward kinematics model; and simultaneously solving the second forward kinematics model and the first forward kinematics model to obtain an end effector deviation function;

sending target end effector pose instructions to the robotic arm in a current zero point situation, and acquiring a spatial deviation of an actual position of an end effector;

inputting position information of each joint angle and the spatial deviation, after each stop of motion of the end effector, into the end effector deviation function, and performing transposition to obtain an objective optimization function; and solving the objective optimization function to obtain a zero deviation value, performing zero calibration for the robotic arm based on the zero deviation value, and controlling motion of the robotic arm after the zero calibration;

wherein, the sending target end effector pose instructions to the robotic arm in a current zero point situation, and acquiring a spatial deviation of an actual position of an end effector specifically comprises:

sending m target end effector pose instructions to the robotic arm in the current zero point situation; and acquiring the spatial deviation between a position of the end effector after the sending of each of second to m-th target end effector pose instructions and after stop of motion of the robotic arm and the actual position of the end effector after the sending of a first target end effector pose instruction;

wherein, the end effector deviation function is specifically:

$$\Delta p = p' - p = f(q + \Delta q) - f(q);$$

wherein, f is a function that characterizes a relationship between values of each joint angle of the robotic arm and a spatial pose of the end effector; q is an n-dimensional vector, representing the values of each joint angle; p is a 3-dimensional vector, representing the spatial pose of the end effector based on f; $\Delta q$ is an n-dimensional vector, representing a deviation of each joint angle between the current zero point and an ideal zero point; and p' is a 3-dimensional vector, representing an actual spatial pose of the end effector.

2. The zero calibration method for a robotic arm control according to claim 1, wherein the objective optimization function is specifically:

$$e_i = \Delta p_i - (f(q_i + \Delta q) - f(q_i));$$

wherein, i=1,2, . . . ,m; f is a function that characterizes a relationship between values of each joint angle of the robotic arm and a spatial pose of the end effector; q is an n-dimensional vector, representing the values of each joint angle; p is a 3-dimensional vector, representing the spatial pose of the end effector based on f; and $\Delta q$ is an n-dimensional vector, representing a deviation of each joint angle between the current zero point and an ideal zero point.

3. A zero calibration device for a robotic arm control, comprising a processor and a memory, wherein
    the memory is configured to store program code and transmit the program code to the processor; and
    the processor is configured to execute the zero calibration method for a robotic arm control according to claim 2 based on an instruction in the program code.

4. A non-transitory computer-readable storage medium, wherein the non-transitory computer-readable storage medium is configured to store a program code for executing the zero calibration method for a robotic arm control according to claim 2.

5. A zero calibration device for a robotic arm control, comprising a processor and a memory, wherein
    the memory is configured to store program code and transmit the program code to the processor; and
    the processor is configured to execute the zero calibration method for a robotic arm control according to claim 1 based on an instruction in the program code.

6. A non-transitory computer-readable storage medium, wherein the non-transitory computer-readable storage medium is configured to store a program code for executing the zero calibration method for a robotic arm control according to claim 1.

7. A zero calibration system for a robotic arm control, comprising:
    a modeling unit, configured to add, based on a first forward kinematics model of a robotic arm, zero deviations of each joint to form a second forward kinematics model; and simultaneously solve the second forward kinematics model and the first forward kinematics model to obtain an end effector deviation function;

an acquisition unit, configured to send target end effector pose instructions to the robotic arm in a current zero point situation, and acquire a spatial deviation of an actual position of an end effector;
    a transform unit, configured to input position information of each joint angle and the spatial deviation, after each stop of motion of the end effector, into the end effector deviation function, and perform transposition to obtain an objective optimization function; and
    a calculation unit, configured to solve the objective optimization function to obtain a zero deviation value, perform zero calibration for the robotic arm based on the zero deviation value, and control motion of the robotic arm after the zero calibration;
wherein, the acquisition unit is specifically configured to:
send m target end effector pose instructions to the robotic arm in the current zero point situation; and acquire the spatial deviation between a position of the end effector after the sending of each of second to m-th target end effector pose instructions and after stop of motion of the robotic arm and the actual position of the end effector after the sending of a first target end effector pose instruction; and
The end effector deviation function is specifically:

$$\Delta p = p' - p = f(q + \Delta q) - f(q);$$

wherein, f is a function that characterizes a relationship between values of each joint angle of the robotic arm and a spatial pose of the end effector; q is an n-dimensional vector, representing the values of each joint angle; p is a 3-dimensional vector, representing the spatial pose of the end effector based on f; $\Delta q$ is an n-dimensional vector, representing a deviation of each joint angle between the current zero point and an ideal zero point; and p' is a 3-dimensional vector, representing an actual spatial pose of the end effector.

8. The zero calibration system for a robotic arm control according to claim 7, wherein
    the objective optimization function is specifically:

$$e_i = \Delta p_i - (f(q_i + \Delta q) - f(q_i));$$

wherein, i=1,2, . . . ,m; f is a function that characterizes a relationship between values of each joint angle of the robotic arm and a spatial pose of the end effector; q is an n-dimensional vector, representing the values of each joint angle; p is a 3-dimensional vector, representing the spatial pose of the end effector based on f; and $\Delta q$ is an n-dimensional vector, representing a deviation of each joint angle between the current zero point and an ideal zero point.

\* \* \* \* \*